(12) United States Patent
Weusthof

(10) Patent No.: US 8,776,656 B2
(45) Date of Patent: Jul. 15, 2014

(54) CIRCULAR AND MITER BOX SAW

(76) Inventor: Gerhard Weusthof, Schapen (DE)

( * ) Notice: Subject to any disclaimer, the term of this patent is extended or adjusted under 35 U.S.C. 154(b) by 381 days.

(21) Appl. No.: 13/055,565

(22) PCT Filed: Jul. 21, 2009

(86) PCT No.: PCT/EP2009/005281
§ 371 (c)(1),
(2), (4) Date: Jan. 24, 2011

(87) PCT Pub. No.: WO2010/009861
PCT Pub. Date: Jan. 28, 2010

(65) Prior Publication Data
US 2011/0132167 A1 Jun. 9, 2011

(30) Foreign Application Priority Data

Jul. 22, 2008 (DE) .......................... 10 2008 034 273
Sep. 12, 2008 (DE) .......................... 10 2008 012 213

(51) Int. Cl.
*B27B 5/18* (2006.01)
*B23D 33/02* (2006.01)

(52) U.S. Cl.
USPC .............................. 83/471.3; 83/477; 83/471

(58) Field of Classification Search
USPC ............ 83/471.3, 473, 490, 472, 477.2, 485,
83/486, 486.1, 733, 395, 394, 391
See application file for complete search history.

(56) References Cited

U.S. PATENT DOCUMENTS

| 63,658 | A | * | 4/1867 | Shumard et al. ................ 83/409 |
| 525,725 | A | * | 9/1894 | Smith .............................. 83/767 |
| 542,738 | A | * | 7/1895 | Levan .............................. 83/760 |
| 593,751 | A | * | 11/1897 | Miller .............................. 83/766 |
| 710,672 | A | * | 10/1902 | Doty ............................... 83/733 |
| 824,744 | A | * | 7/1906 | Sabin .............................. 83/416 |
| 828,437 | A | * | 8/1906 | Stimpson ........................ 83/77 |
| 828,508 | A | * | 8/1906 | Ross ............................... 83/733 |
| 886,982 | A | * | 5/1908 | Isler ............................... 83/416 |
| 1,210,552 | A | * | 1/1917 | Silvius ........................... 83/416 |
| 2,911,017 | A | * | 11/1959 | Holder ............................ 83/574 |
| 4,211,134 | A | * | 7/1980 | Thorsell et al. ............. 83/471.3 |
| 4,346,636 | A | * | 8/1982 | Taylor ............................ 83/767 |
| 4,356,749 | A | * | 11/1982 | Spencer ......................... 83/765 |

(Continued)

FOREIGN PATENT DOCUMENTS

DE    2443550 A1    4/1976
DE    2829297 A1    1/1980

(Continued)

*Primary Examiner* — Sean Michalski
*Assistant Examiner* — Jonathan G Riley
(74) *Attorney, Agent, or Firm* — Laurence A. Greenberg; Werner H. Stemer; Ralph E. Locher

(57) ABSTRACT

A circular and miter box saw has a contact table containing a support device that can be pivoted about a pivoting axis relative to the contact table and a base plate. The support device is pivot-supported on the base plate. The saw further has a miter box arm that can be pivoted about the pivoting axis, and a sawing device being disposed on the miter box arm, or above the contact table, respectively, wherein the sawing device can be displaced by a gliding guide device. The circular and miter box saw has a high cutting quality and a safe work piece contact surface and is characterized in that the gliding guide device is provided substantially below the base plate.

23 Claims, 10 Drawing Sheets

(56) References Cited

U.S. PATENT DOCUMENTS

| | | | |
|---|---|---|---|
| 4,365,531 A * | 12/1982 | Potvin | 83/767 |
| 4,448,102 A * | 5/1984 | Thornton | 83/471.1 |
| 4,452,117 A * | 6/1984 | Brickner et al. | 83/468 |
| 4,587,875 A * | 5/1986 | Deley | 83/471.3 |
| 5,054,352 A | 10/1991 | Fushiya et al. | |
| 5,105,862 A * | 4/1992 | Skinner et al. | 144/287 |
| 5,159,864 A | 11/1992 | Wedemeyer et al. | |
| 5,595,124 A * | 1/1997 | Wixey et al. | 108/50.11 |
| 5,743,161 A * | 4/1998 | Boudreau | 83/435.11 |
| 5,752,421 A | 5/1998 | Chang | |
| 5,870,939 A | 2/1999 | Matusbara | |
| 5,937,720 A | 8/1999 | Itzov | |
| 5,957,022 A * | 9/1999 | Stumpf et al. | 83/468.2 |
| 5,988,031 A * | 11/1999 | Wixey | 83/471.3 |
| 6,595,096 B2 * | 7/2003 | Ceroll et al. | 83/473 |
| 6,705,809 B2 * | 3/2004 | Manos, Jr. | 408/89 |
| 6,769,338 B2 | 8/2004 | Svetlik et al. | |
| 6,779,428 B2 * | 8/2004 | Kao | 83/469 |
| 6,810,780 B2 | 11/2004 | Ceroll et al. | |
| 7,021,186 B2 * | 4/2006 | Brazell et al. | 83/471.3 |
| 7,201,090 B2 * | 4/2007 | Svetlik et al. | 83/471.3 |
| 7,549,196 B2 | 6/2009 | Ziegs et al. | |
| 7,819,044 B2 | 10/2010 | Meredith | |
| 7,854,187 B2 * | 12/2010 | Liu et al. | 83/471.3 |
| 8,539,870 B2 * | 9/2013 | Behr | 83/471.3 |
| 2002/0088327 A1 | 7/2002 | Young | |
| 2006/0156883 A1 | 7/2006 | Kenyon et al. | |
| 2007/0234864 A1 * | 10/2007 | Bettacchini | 83/471.3 |
| 2008/0041211 A1 * | 2/2008 | Gibbons et al. | 83/473 |
| 2009/0104861 A1 | 4/2009 | Van der Linde et al. | |
| 2009/0301278 A1 | 12/2009 | Agan et al. | |

FOREIGN PATENT DOCUMENTS

| | | |
|---|---|---|
| DE | 3119573 A1 | 12/1982 |
| DE | 4302676 A1 | 8/1994 |
| DE | 19632229 A1 | 3/1997 |
| DE | 20114319 U1 | 1/2002 |
| DE | 203 13 885 U1 | 11/2003 |
| DE | 69631976 T2 | 8/2004 |
| DE | 20 2006 012 418 U1 | 11/2006 |
| DE | 60307557 T2 | 8/2007 |
| DE | 202007001945 U1 | 6/2008 |
| EP | 0 379 322 A1 | 7/1990 |
| EP | 0611632 A1 | 8/1994 |
| EP | 0622015 A1 | 11/1994 |
| EP | 1256407 A1 | 11/2002 |
| EP | 1350608 A2 | 10/2003 |
| EP | 1 405 703 A1 | 4/2004 |
| EP | 1541305 A1 | 6/2005 |
| EP | 1614492 A1 | 1/2006 |
| EP | 1702724 A2 | 9/2006 |
| EP | 1955801 A2 | 8/2008 |
| EP | 2130632 A2 | 12/2009 |
| GB | 2270031 A | 3/1994 |
| GB | 2 446 317 A | 8/2008 |
| WO | 2007121534 A1 | 11/2007 |

* cited by examiner

CIRCULAR AND MITER BOX SAW

BACKGROUND OF THE INVENTION

Field of the Invention

The invention relates to a circular and miter saw having a seating table, having a bearing means that can be pivoted about a pivot axis relative to the seating table, having a base plate, wherein the bearing means is pivotally supported on the base plate, and having a miter arm that can be pivoted about the pivot axis, and a sawing device disposed on the miter arm, preferably above the seating table, the sawing device being displaceable by means of a sliding guide device.

Workpieces of, for example, metal, wood, plastic or the like can be trimmed to size at a settable angle by means of a circular and miter saw. In particular, circular and miter saws can be used to trim workpiece bars to size at an angle—the miter angle—that is other than the right angle. The workpiece in this case is placed onto a seating table of the circular and miter saw. A sawing device, having a rotatable saw blade for sawing the workpiece, is disposed on the miter arm, above the seating table. The miter arm is preferably mounted, via a bearing means, so as to be pivotable about a pivot axis. The pivot axis is realized as a normal axis. The miter angle can be set by pivoting the miter arm. Further, the miter arm is preferably pivotable about a miter axis, the miter axis extending substantially perpendicularly in relation to the pivot axis.

After the miter angle has been set, the workpiece can be docked, or sawn through, by means of the sawing device, for which purpose the sawing device can be pivoted downwards—about a transverse axis. The transverse axis in this case is preferably substantially perpendicular to the pivot axis and substantially perpendicular to the miter axis. Here, the sawing device is designed so as to be displaceable in the radial direction relative to the pivot axis, by means of a sliding guide device, such that, after the sawing device has been lowered to the level of the workpiece, the workpiece can be cut through by being radially displaced in the direction of the pivot axis, preferably along the miter axis.

A circular and miter saw is known from DE 203 13 885 U1. A similar circular and miter saw is also known from DE 20 2006 912418 U1. In the case of these circular and miter saws, a rotationally fixed seating table that is realized in two parts is constituted by lateral seating blocks/projections provided on a bottom plate, the bottom plate additionally have a receiving space, and a bearing means, realized as a rotary disk, being carried in the receiving space so as to be pivotable about a pivot axis. Here, the base of the receiving space is constituted by a base plate, on which the rotary disk is supported. The rotary disk serves here as a bearing means for the miter arm and for the sawing device disposed on the miter arm. The top side of the rotary disk and the top side of the seating table lie approximately in one plane. The rotary disk carries a side arm, the side arm having a groove extending as far as the center point of the rotary disk. A saw blade of the electric sawing device can be inserted into the groove. Here, the sliding guide device, for radially displacing the sawing device along the miter axis, i.e. towards the pivot axis or away from the pivot axis, is attached to the miter arm, at the level of the sawing device, i.e. above the rotary disk.

A miter saw for cutting a workpiece disposed on a seating table is known from EP 0 379 322 B1. The seating table has a receiving space realized in its center. A bearing means, realized as a rotary table, is rotatably mounted in the receiving space. At the right and left next to the rotary table, the seating table, realized in two parts, is constituted by projections, the top sides serving as workpiece seating surfaces. The rotary table disposed between the projections lies with its top side in the same plane as the workpiece seating surfaces of the projections. Here, the rotary table is inserted into the receiving space of the seating table from above. This miter saw additionally has a sliding guide device. The sliding guide device has a sliding rod, which extends through the circumferential wall of the rotary table, substantially in the direction of the diameter of the rotary table. The sliding rod is mounted so as to be displaceable in the direction of the diameter. A miter arm, with the electric sawing device, is disposed on the sliding rod, such that the sawing device is displaceable in the radial direction by means of the sliding guide device.

The circular and miter saws known in the prior art are not yet optimally realized. In particular, owing to the fact that here a rotary table is rotatably mounted in a receiving space, the known circular and miter saws require a large amount of space, and are therefore not realized in a compact manner, which makes them difficult to transport and also to arrange, particularly at assembly sites. Furthermore, the rotary tables constitute a relative large seating surface for the workpieces. Practice has shown that, when a rotary table is turned, the workpiece lying thereon can also slip with it to some extent, such that the cut quality in the case of known circular and miter saws is problematic, i.e. not always optimal, since, owing to the concomitantly rotating, relatively large surface of the rotary table, there is no secure workpiece seating. Consequently, the circular and miter saws known in the prior art are not yet optimally realized.

BRIEF SUMMARY OF THE INVENTION

The invention is therefore based on the object of designing and developing a circular and miter saw in such a way that its cut quality is improved, a secure workpiece seating is provided, and a compact structure is realized.

The previously indicated object is now achieved for a circular and miter saw in that the sliding guide device is provided substantially below the base plate. The sliding guide device is provided, or disposed, below the base plate in order, firstly, to achieve a low center of mass of the circular and miter saw, as a result of which, firstly, the miter arm can be guided in a sure and smooth manner. Preferably, the sawing device, in particular with the miter arm, can additionally be pivoted about a miter axis, the miter axis being substantially perpendicular to the pivot axis and extending parallelwise in relation to the direction of motion of the sliding guide device. Owing to the fact that the sliding guide device is now disposed below the base plate, the sliding guide device, in particular, is not also realized so as to be pivotable about the miter axis. Preferably, only the miter arm, with the sawing device, is realized so as to be pivotable about the miter axis, the sliding guide device disposed below the miter axis not being pivoted about the miter axis, as a result of which the torsional stiffness of the circular and miter saw during the cutting/sawing operation is increased. Because of this disposition, a precise operating sliding guide device can now be provided, which greatly increases the cut quality during cutting. The sliding guide is disposed below the bearing means and below the base plate. Owing to the fact that the bearing means, the base plate and the sliding guide device are now realized as separate assemblies, which are preferably disposed sequentially over one another in a type of "sandwich construction method", the fixed seating table can extend substantially as far as the pivot axis and additionally cover the bearing means, at least partially. As a result, the rotationally fixed workpiece seating surface is now enlarged. Upon setting of the respective pivot position about the pivot axis, the workpiece therefore has a large-area contact with the rotationally fixed seating table, enabling the workpiece to be securely seated, in particular upon setting of the pivot position about the pivot axis. In particular, however, because of the separate assembly "sandwich construction method", preferably because of the seating table, which at least partially covers the bearing means, because of the base plate then being disposed thereunder and because of the sliding guide device, in turn, being disposed thereunder, a very compactly realized circular and miter saw is realized, which requires only a small amount of space, can be transported particularly easily and can also always be set up in a space-saving manner at an "assembly site". The disadvantages described at the outset are therefore avoided, and corresponding advantages are achieved.

There are a multiplicity of possibilities for designing and developing the circular and miter saw according to the invention in an advantageous manner. A preferred design of the invention is now explained more fully in the following on the basis of the drawing and the associated description. In the drawing:

DESCRIPTION OF THE INVENTION

In FIGS. 1 to 10, a circular and miter saw 1 and its principal components are clearly depicted in various schematic representations.

The circular and miter saw 1 can be used to cut, in particular, strips, panels or plates to the desired length, preferably including the desired miter cuts. As to be described in detail in the following, the circular and miter saw 1 can therefore be used not only to make a cut at right angles to the longitudinal axis of the workpiece, not represented, but also so-called miter cuts at an acute angle to the longitudinal axis of the workpiece. The circular and miter saw 1 is preferably realized so as to be transportable. The size and the weight of the circular and miter saw 1 are preferably dimensioned in such a way that the latter can also be transported in a trunk of a motor vehicle by a user, for example a craftsman.

The circular and miter saw 1 has, firstly, a seating table 2. The seating table 2 in this case has a top side 3, the top side 3 serving to seat the workpiece, not represented.

Figure 7:
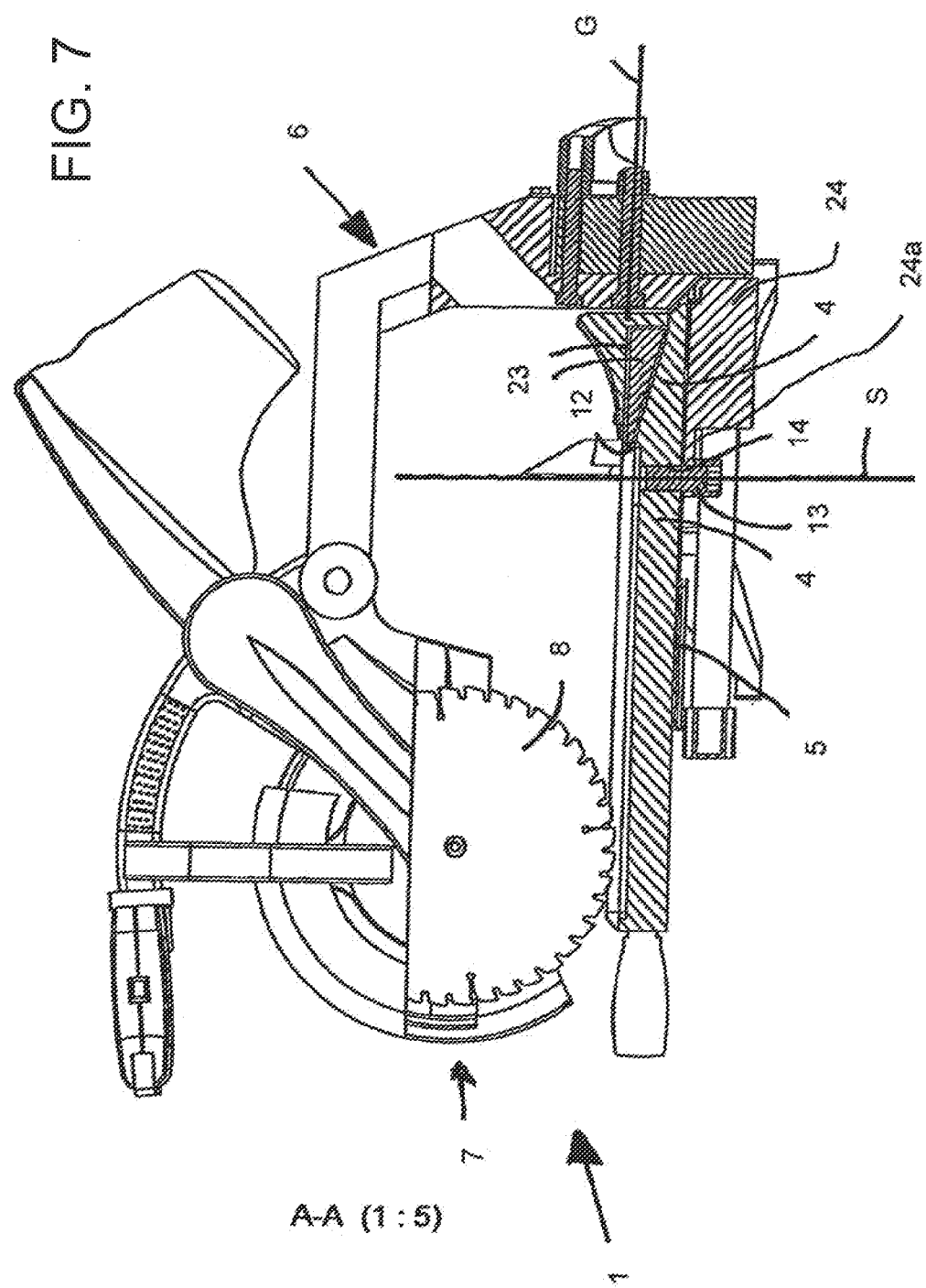
FIG. 7 shows a schematic, partially sectional side view of the circular and miter saw from FIGS. 1 to 6.
Figure 8:
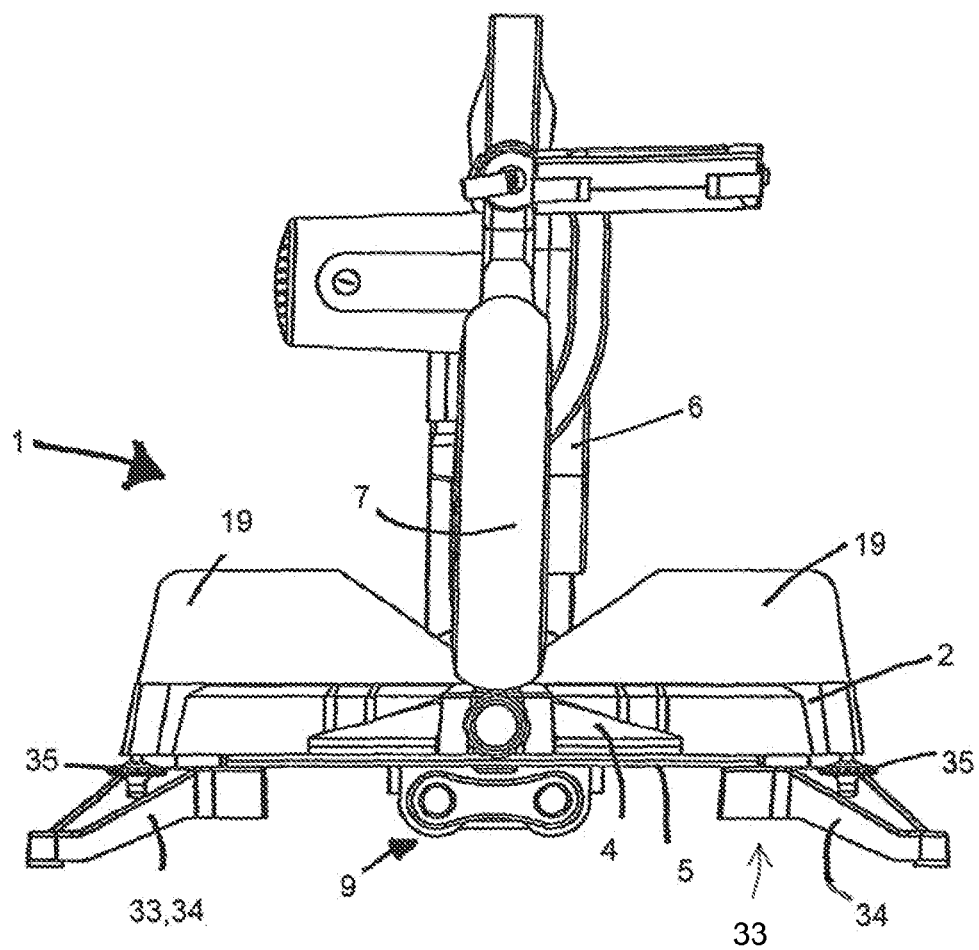
FIG. 8 shows a schematic front view of the circular and miter saw from FIGS. 1 to 7.
Figure 9:
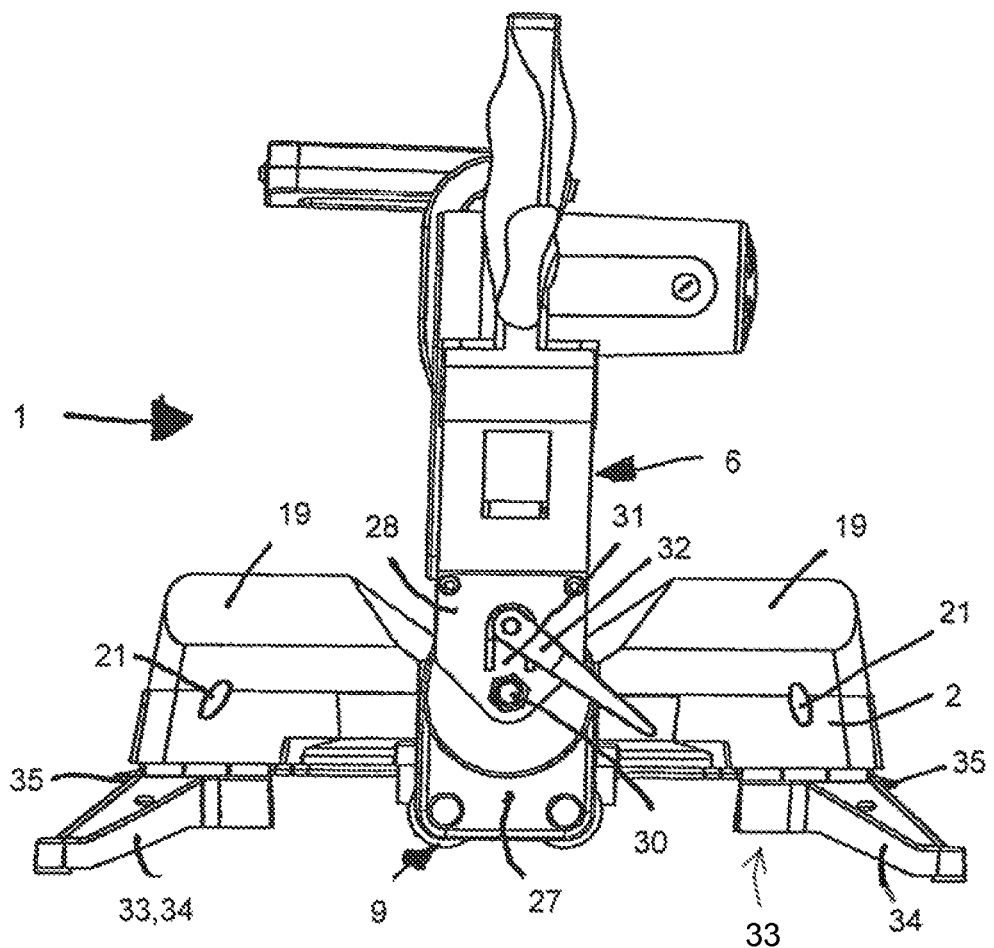
FIG. 9 shows a schematic rear view of the circular and miter saw from FIGS. 1 to 8.
Figure 10:
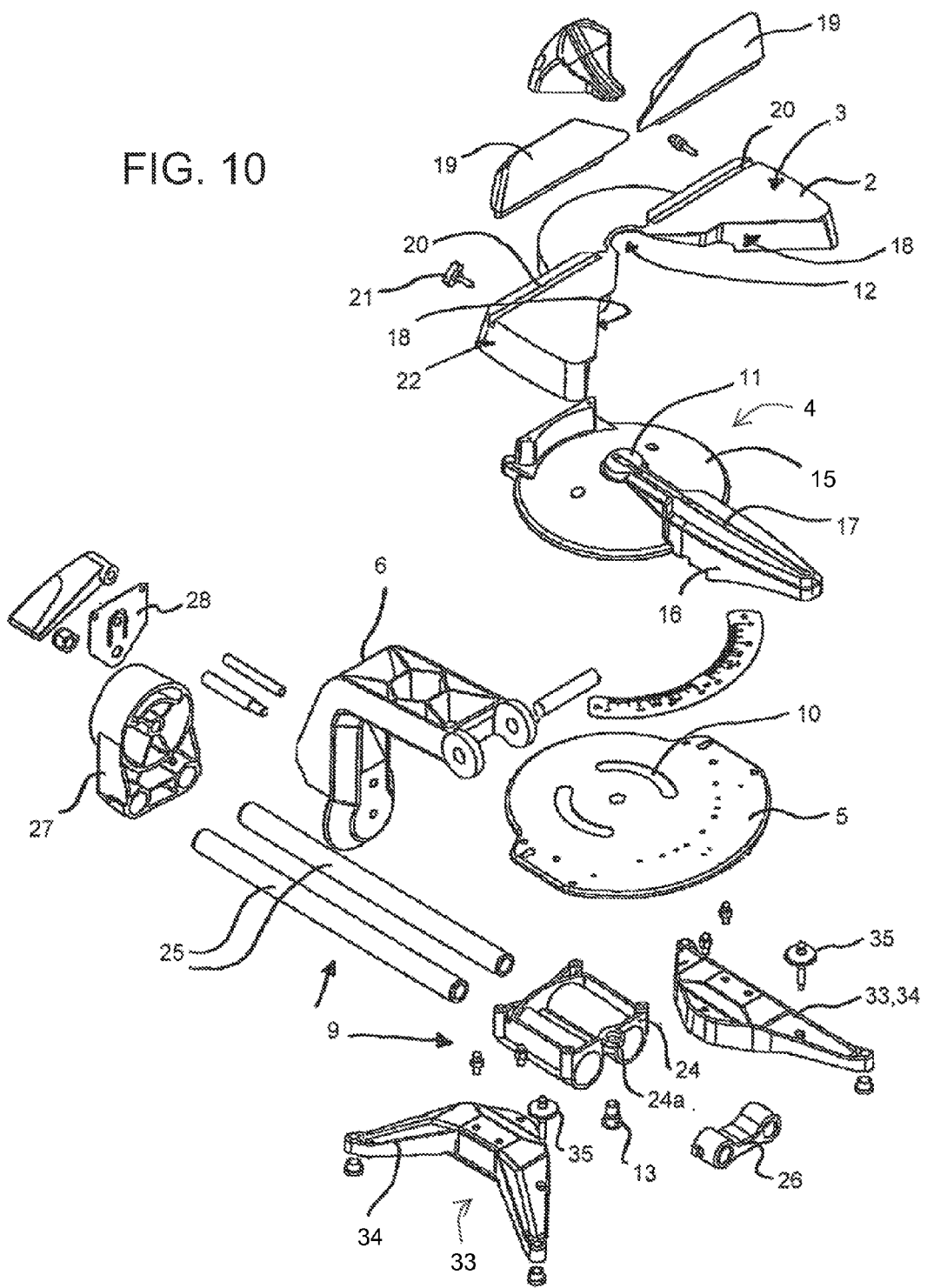
FIG. 10 shows, in a schematic representation, an exploded representation of the principal components of the circular and miter saw according to the invention.

The circular and miter saw 1 additionally has a bearing means 4 that can be pivoted about a pivot axis S relative to the seating table 2 (cf. also FIG. 7). The bearing means 4 is preferably disposed on a base plate 5. The base plate 5 therefore constitutes a support element for the bearing means 4, and can therefore also be referred to as a "support plate".

The bearing means 4 is supported on the base plate 5 so as to be pivotable about the pivot axis S.

A miter arm 6 is connected to the bearing means 4 in a functionally operative manner, which is to be explained in yet greater detail in the following. The miter arm 6 can therefore be pivoted, together with the bearing means 4, about the pivot axis S. A sawing device 7 is disposed on the miter arm 6. The sawing device 7 in this case is preferably disposed above the seating table 2. The sawing device 7 is realized so as to be swivelable, preferably downwards, for the purpose of docking the workpiece, not represented, and thereafter can be pivoted back upwards into the initial position. The sawing device 7 has a saw blade 8, preferably a circular saw blade, which can preferably be motor-driven. The sawing device 7 is mounted, at one end of the miter arm, so as to be pivotable upwards and/or downwards on a transverse axis, not denoted in greater detail. In addition, the sawing device 7 can be displaced in the "radial direction", parallel to a miter axis G, by means of a sliding guide device 9, in particular, therefore, displaced in the direction of the pivot axis S or away from the latter, as represented, in particular, by the arrows P in FIG. 6. Because of the sliding guide device 9, the length of the saw cut is not limited to the diameter of the saw blade 8, but is extended by the possible displacement path of the sawing device 7, by means of the sliding guide device 9. The length of the saw cut therefore preferably results from the length of pass and from the diameter of the saw blade 8.

The disadvantages described at the outset are now avoided, firstly, in that the sliding guide device 9 is provided substantially below the base plate 5. This has the advantage that, on the one hand, the sliding guide device 9 need not be mounted so as to be pivotable about the miter axis G and, on the other hand, the center of mass of the sliding guide device 9 extends close to the cutting plane, enabling the sawing device 7 to be displaced and/or pivoted in a precise and torsionally stiff manner. In particular, owing to the "sandwich construction method", namely, the sequential disposition (as viewed from top to bottom) of the bearing means 4, the base plate 5 and the sliding guide device 9, a very compact circular and miter saw 1 is realized, which, on the one hand, is easily transportable in a space-saving manner by motor vehicle, for example by fitters, and which can also easily be set up in a space-saving manner at the assembly location.

Here, the bearing means 4 is disposed in the region between the seating table 2, namely, preferably in the region between the projections 22 and the base plate 5. In the present design, the base plate 5 and the seating table 2, or the projections 22, are screwed to one another. Preferably, the seating table 2, which is constituted substantially by the two projections 22 provided, and the base plate 5 constitute a solid assembly. Here, the assembly of the base plate 5 and of the bearing means 4 is preferably effected from below. Firstly, the bearing means 4 is inserted into the turned-over seating table 2, and the base plate 5 is then placed on and operatively connected to the underside of the seating table 2. Then, preferably, the sliding guide device 9 is fitted.

Figure 1:
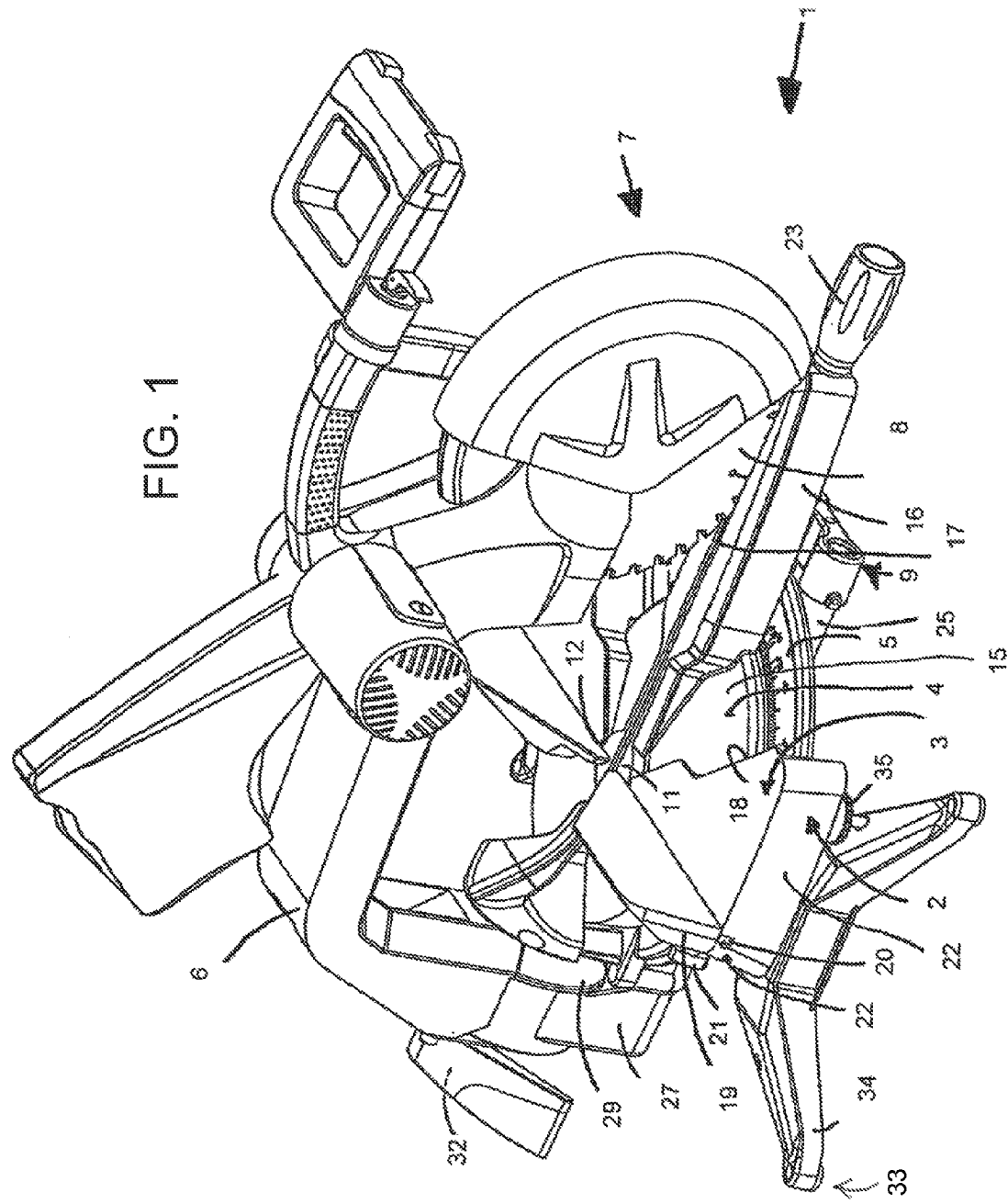
FIG. 1 shows a schematic, perspective representation of a circular and miter saw, viewed obliquely from above at the front.
Figure 2:
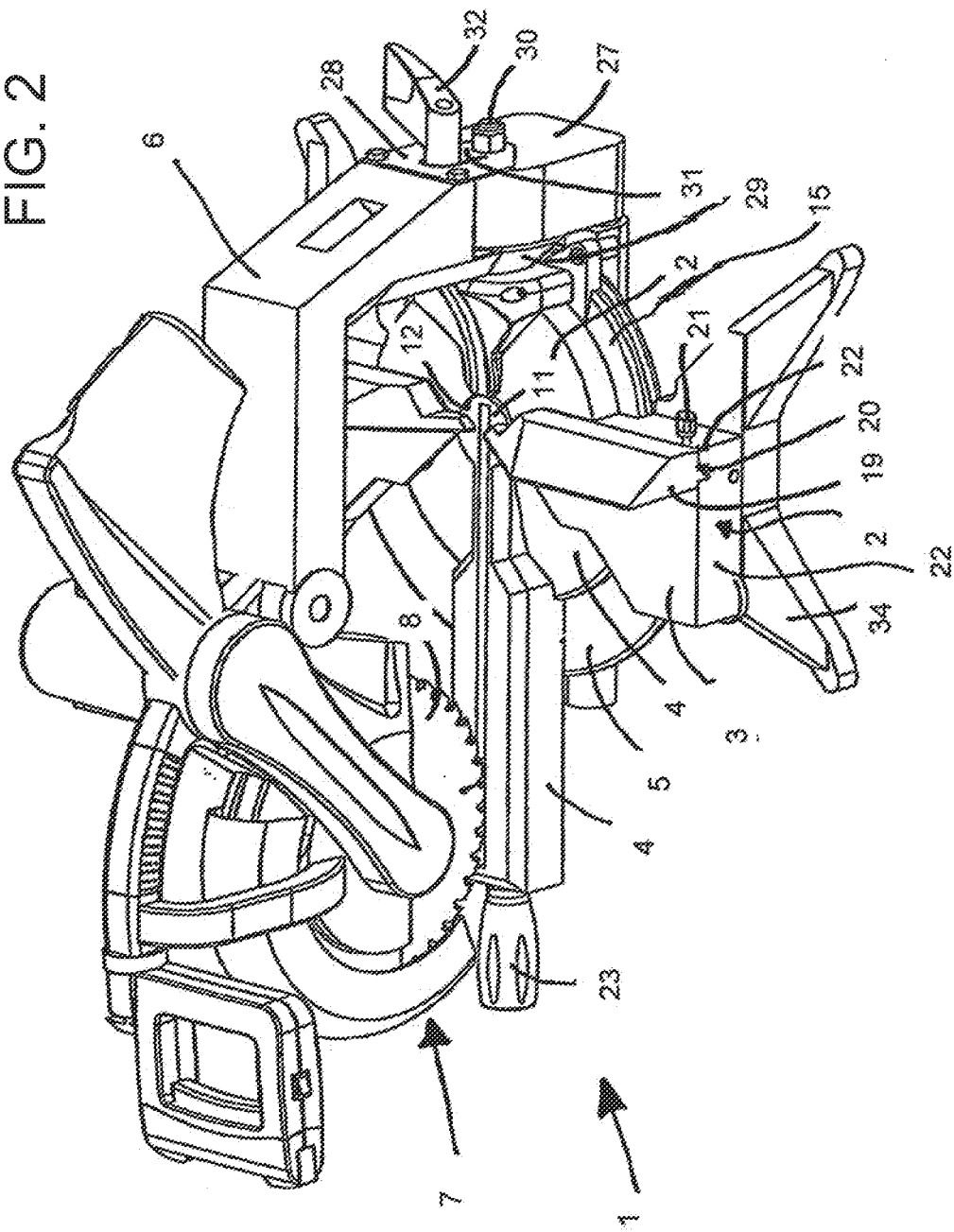
FIG. 2 shows a schematic, perspective representation of a circular and miter saw from FIG. 1, viewed obliquely from above at the back.
Figure 3:
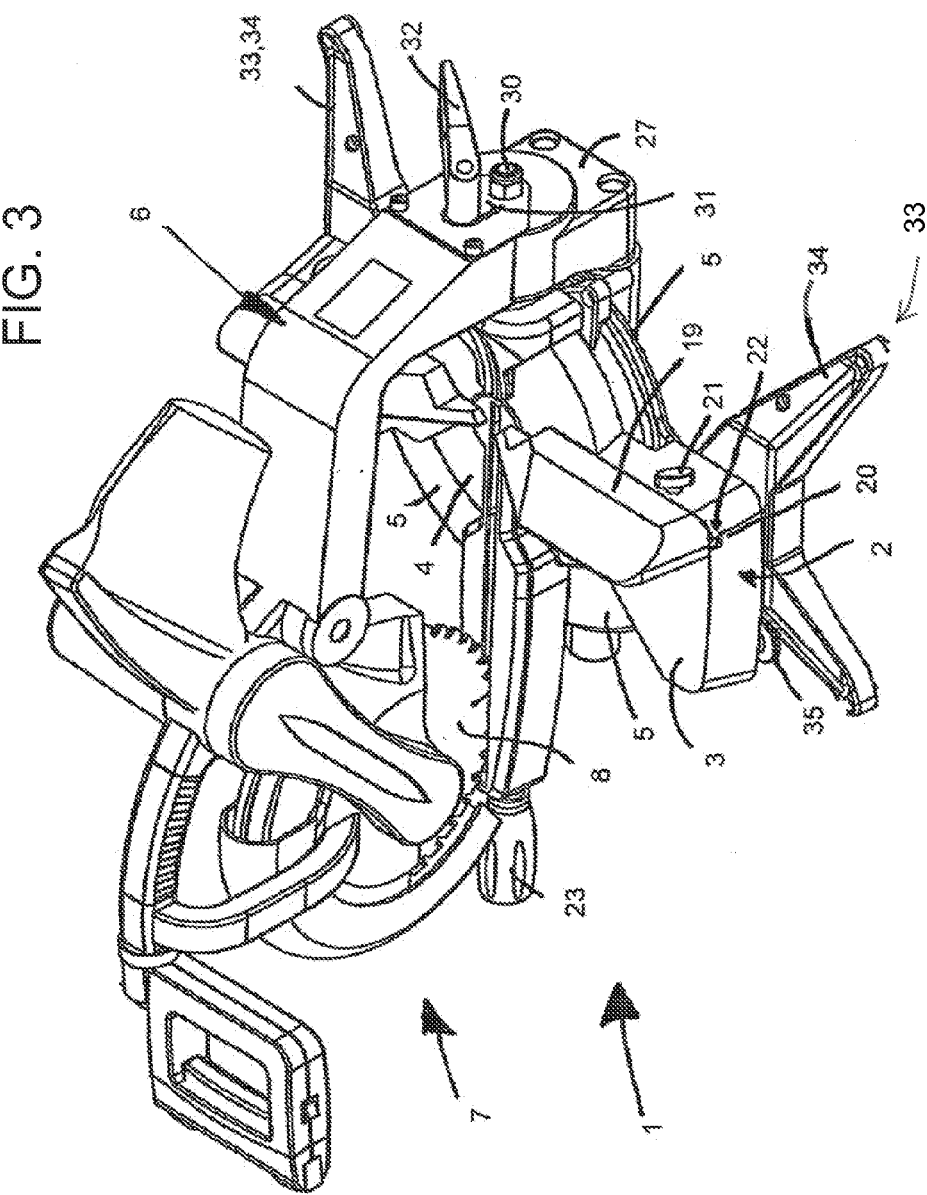
FIG. 3 shows a schematic, perspective representation of the circular and miter saw from FIGS. 1 and 2, likewise viewed obliquely from above at the back.

In a different design, the seating table 2 and the base plate 5 can be realized, not as separate parts, but also as an integrally realized structural unit. Further, the seating table 2 and the base plate 5 can each be constructed as one or more parts. The base plate 5 is preferably realized in the form of a disk. The base plate 5 preferably has an angle scale. FIG. 1 shows clearly that the base plate 5 projects over the bearing means 4 by an edge that is not designated in greater detail, and that this edge comprises the angle scale, not designated in greater detail, for setting the pivot position about the pivot axis S.

Figure 4:
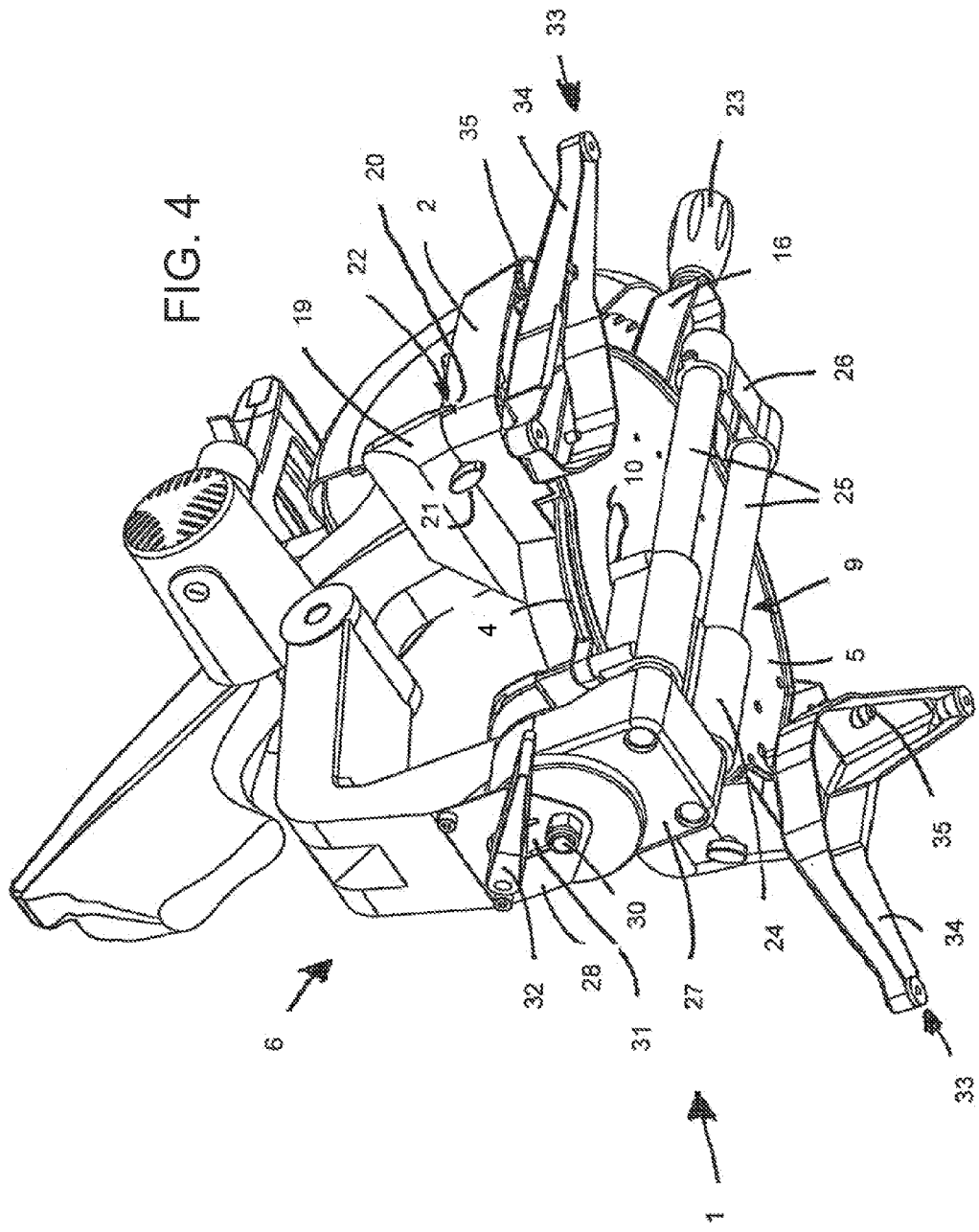
FIG. 4 shows a schematic, perspective representation of the circular and miter saw from FIGS. 1 to 3, viewed obliquely from below at the back.
Figure 5:
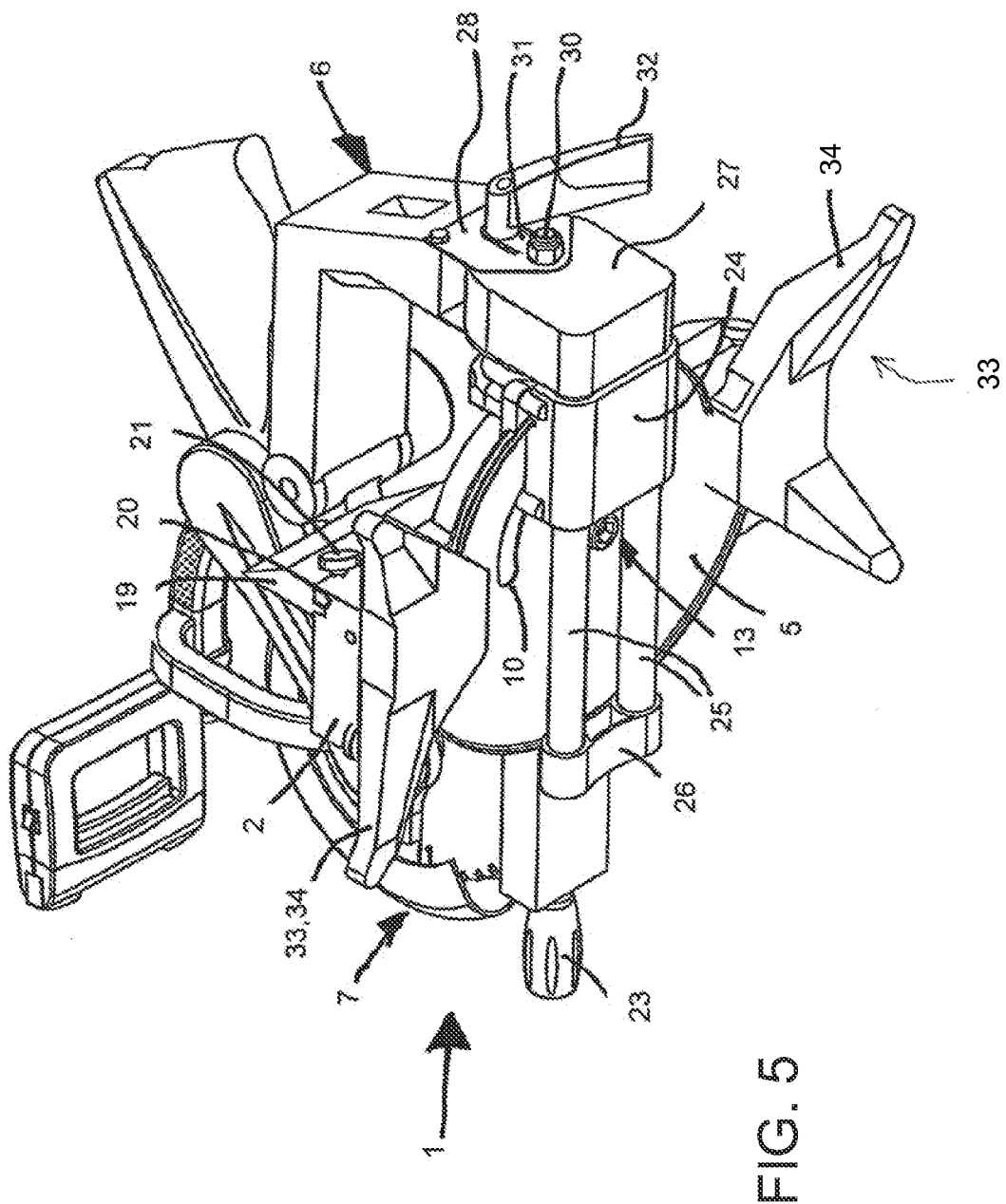
FIG. 5 shows a schematic perspective representation of the circular and miter saw from FIGS. 1 to 4, likewise viewed from below at the back.
Figure 6:
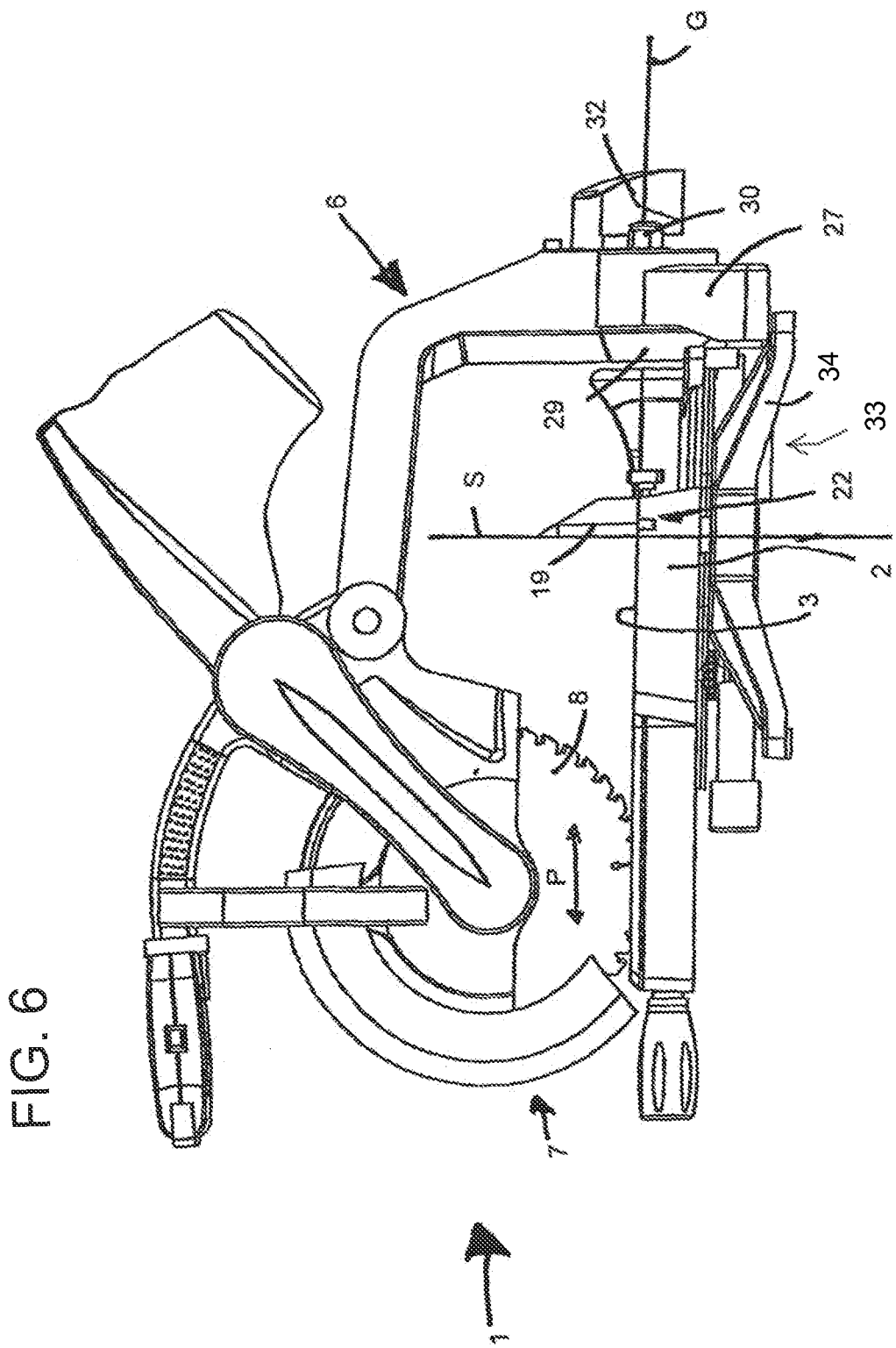
FIG. 6 shows a schematic side view of the circular and miter saw from FIGS. 1 to 5.

The base plate 5 preferably has an arcuate guide slot 10 (cf. FIGS. 4, 5). The guide slot 10 is disposed concentrically in relation to the pivot axis S. The sliding guide device 9 and the bearing means 4 are preferably connected to one another by at least one guide element, preferably a bolt or a screw (not represented in detail here), extending through the guide slot 10. In particular, two or more bolts can extend through the guide slot 10 and connect the bearing means 4 and the sliding guide device 9 to one another. For the purpose of bearing support, the bearing means 4 preferably has an at least partially cylindrical bearing projection 11 in the region of the pivot axis S. In the region of the pivot axis S, the seating table 2 has an at least partially cylindrical opening 12 that matches this bearing projection, the bearing projection 11 engaging in the opening 12. The partially cylindrical opening 12 therefore serves as a bearing pressure point during pivoting about the pivot axis S.

In the region of the pivot axis S, a screw 13 preferably projects through the base plate 5, as represented, in particular, in FIG. 7, for the purpose of mounting the bearing means 4 so as to be pivotable about the pivot axis S on the base plate 5. The bearing means 4 has a corresponding receiver 14, the screw 13 engaging in the receiver 14.

As further shown by the figures, the sliding guide device 9 has a sliding guide 24, preferably realized in the manner of a block, which—as shown by FIG. 7—has a plate-like projection 24a. By means of the plate-type projection 24a, the sliding guide 24 can now be fixedly connected to the receiver 14 of the bearing means 4, via the screw 13. The bearing means 4 is thereby now preferably connected to the sliding guide 24 in a rotationally fixed manner, in such a way that, upon a pivoting movement of the bearing means 4, the sliding guide 24 also concomitantly executes this pivoting movement, since the screw 13 extends through a bearing opening of the base plate 5, which bearing opening is not designated in greater detail. A different type of mounting, for example via a bolt, is also conceivable.

Further, it can also be seen clearly in FIG. 7 that the seating table 2 at least partially covers the bearing means 4. The top side of the bearing means 4, which is not designated in greater detail, in this case preferably extends partially below the top side 3 of the seating table 2. As a result, a large workpiece seating surface is provided, this workpiece seating surface being disposed in a rotationally fixed manner in relation to the workpiece, even when the bearing means 4 is pivoted about the pivot axis S.

The bearing means 4 preferably has a rotary disk 15 and a side arm 16. The side arm 16 has a groove 17 extending in the radial direction of the rotary disk 15, the sawing device 7 being insertable, with the saw blade 8, into the groove 17. The groove 17 can also be realized in a strip element that can be disposed on the side arm. The rotary disk 15 in this case is rotatably mounted by means of the screw 13 that extends through the passage opening of the base plate 5, the screw 13 being fixedly screwed within the receiver 14, such that the bearing means 4 is coupled to the sliding guide 24. The rotary disk 15 and the side arm 16 are preferably realized as an integral assembly, preferably as a single piece. The rotary disk 15 is realized so as to be thicker in the region of the pivot axis S than at its edge, as a result of which the side arm 16 projects up over the rotary disk 15, towards the periphery of the rotary disk 15.

The seating table 2 has a substantially V-shaped recess 18, the side arm 16 being pivotable within the recess 18. Here, at each side, the recess 18 of the seating table 2 constitutes a stop (not designated in greater detail) for the side arm 16. Preferably, the bearing means 4 can be pivoted from +45° to −45°. The recess 18 therefore preferably has an opening angle of at least 90°. The pivoting movement of the side arm 16 together with the rotary disk 15 is limited by the recess 18.

Two upwardly projecting stop strips 19 in alignment with one another are preferably disposed on the seating table 2 for the purpose of placement of the workpiece. The stop strips 19 in this case preferably extend substantially as far as the pivot axis S. The stop strips 19 in this case can extend substantially as far as the preferably partially cylindrical opening 12, or as far as the bearing projection 11, or just past the bearing projection 11. In the design represented here, the seating table 2 has a respective slot 20, in which the seating strips 19 engage via an elongate projection, not designated in greater detail. The solid assembly composed of the seating table 2 and the base plate 5 can be machined, preferably in a set-up fixture (not represented), by means of a machine tool and, for example, the seating table 2 can be provided with the slot 20. The stop strips 19 can thus be displaced along the slot 20. The stop strips 19 can preferably be detachably fixed in the slot 20 by means of a respective clamping screw 21.

The seating table 2 has two projections 22, which taper towards the pivot axis S at an acute angle and which are delimited by the stop strips 19, the top side 3 of the projections 22 serving as workpiece seating surfaces. The projections 22 have substantially a triangular shape, corresponding to the V-shaped recess 18. The projections 22, and therefore the workpiece seating surfaces in the case of the seating table 2, extend substantially as far as the pivot axis S, or as far as the partially cylindrical opening 12. The V-shaped recess 18 opens into the partially cylindrical opening 12.

The groove 17 in the side arm 16 preferably extends further over the rotary disk 15 as far as into the bearing projection 11 and preferably past the latter, as clearly depicted. The pivot position of the bearing means 4 relative to the seating table 2 can preferably be detachably fixed by means of a locking mechanism. Of the locking mechanism, only a fixing knob 23, at the end of the side arm 16, is represented here.

The structure and the disposition of the sliding guide device 9 are to be described in greater detail in the following.

The sliding guide device 9 has at least the already mentioned, preferably block-type slide guide 24 and at least one guide rod 25. Here, preferably two guide rods 25 are provided. The sliding guide 24 is fastened to the bearing means 4, preferably to the rotary disk 15. Serving to fasten the sliding guide 24 to the bearing means 4 is, firstly, the projection 24a, which is realized like a plate and is screwed to the receiver 14 of the bearing means 4 by means of a screw 13, the screw 13 extending within a passage opening of the base plate 5 and being rotatably mounted here, in the passage opening, not designated in greater detail. In particular, the rotary disk 15 is additionally connected to the upper region of the sliding guide 24 in a rotationally fixed manner by means of a total of four further screws, not designated in greater detail, such that the sliding device 24 is also indirectly held concomitantly by means of the base plate 5 disposed above the sliding guide 24, since the base plate 5 in fact supports, or holds, the bearing means 4, and therefore now also, indirectly, the sliding guide 24. Preferably, two screw elements, which are disposed between the bearing means 4 and the sliding guide 24, then run concomitantly in the corresponding arcuate guide slot 10 during the swiveling of the bearing means 4, or are guided therein while, again, two screw elements are disposed at the edge of the sliding guide 24 and are connected to an edge projection of the rotary disk 15 in order to carry the sliding guide 24.

The sliding guide 24 guides the at least one guide rod 25—here, the two guide rods 25—the guide rods 25 extending parallelwise in relation to one another and parallelwise in relation to the miter axis G. The guide rods 25 are disposed within the sliding guide 24 so as to be displaceable relative to the sliding guide 24. Here, the sliding guide 24 has two guide-rod receivers (not designated in greater detail) that match the cross-section of the guide rods 25. The two guide rods 25 are connected to one another at one end by a rod clamping piece 26. A miter-arm mount 27 is disposed at the other end of the guide rods 25. Between the rod clamping piece 26 and the miter-arm mount 27, the sliding guide 24 encompasses the two guide rods 25.

The miter arm 6 is preferably mounted on the miter-arm mount 27 so as to be pivotable about the miter axis G. On the miter arm 6, a miter plate 28 can be disposed on one side and a counter-plate 29 can be disposed on the other side, the miter-arm mount 27 being disposed between the miter plate 28 and the counter-plate 29. The miter-arm mount 27 is preferably connected to the miter plate 28 and to the counter-plate 29 by a bolt 30, such that the miter arm 6 can be pivoted about the bolt 30. The bolt 30 in this case extends along the miter axis G. For the purpose of fixing the miter arm 6 in a pivot position about the miter axis G, the miter plate 28 preferably has a flexible joint piece 31 having a bolt opening, not represented in greater detail. The miter-arm mount 27 has an arcuate, elongate hole (not represented), a miter setting bolt (not represented) engaging through the elongate hole and the bolt opening of the joint piece. In FIG. 5, for example, only a lever handle 32 that is connected to the miter setting bolt is represented. Through actuation of the lever handle 32, the joint piece 31 can be drawn against the miter-arm mount 27, such that the joint piece 31 clamps the miter arm 6 in a defined pivot position about the miter axis G, relative to the miter-arm mount 27. A differently functioning fixing device can also be provided to set and fix a particular angle, i.e. pivot position of the miter arm 6 in respect of the miter axis G.

The miter arm 6 is preferably realized substantially in an L shape. An electric motor, for driving the saw blade 8, is preferably disposed on the miter arm 6, or on the sawing device 7.

The circular and miter saw 1 stands on a base frame 33. Here, the base frame 33 consists substantially of two feet 34. The solid assembly composed of the seating table 2 and the base plate 5 is supported on the ground by means of the base frame 33, in particular the two feet 34. The base frame 34 is disposed so as to be movable on the seating table 2 and/or on the base plate 5, such that irregularities of the ground can be compensated. Preferably, the base frame 33, particularly the feet 34, is or are disposed so as to be pivotally movable on the seating table 2 and/or on the base plate 5. Preferably, the pivot positions of the two feet 34 can each be set relative to the seating table 2 and/or the base plate 5 by means of a setting screw 35.

FIG. 10 thus again shows the principal components of the circular and miter saw 1 according to the invention, in an exploded, schematic representation. Clearly evident here again is the sliding guide device 9 with the two guide rods 25, in particular also the sliding guide 24, or the rod clamping piece 26 and the miter-arm mount 27, which are fastened to the respective ends of the guide rods 25. The structure, in particular the sequential structure of the individual components, i.e. the already mentioned "sandwich construction method" is therefore again represented particularly clearly in FIG. 10.

The described disadvantages are therefore avoided, and corresponding advantages are achieved.

LIST OF REFERENCES 1 circular and miter saw
2 seating table
3 top side
4 bearing means
5 base plate
6 miter arm
7 sawing device
8 saw blade
9 sliding guide device
10 guide slot
11 bearing projection
12 opening
13 screw
14 receiver
15 rotary disk
16 side arm
17 groove
18 recess
19 stop strip
20 slot
21 clamping screw
22 projection
23 fixing knob
24 sliding guide
24a projection
25 guide rod
26 rod clamping piece
27 miter-arm mount
28 miter plate
29 counter-plate
30 bolt
31 joint piece
32 lever
33 base frame
34 foot
35 setting screw
S pivot axis
G miter axis
P arrows

The invention claimed is:

1. A circular and miter saw, comprising:
a seating table having a planar workpiece seating surface for supporting a workpiece thereon during cutting;
two stop strips in alignment with one another and disposed on said seating table defining an alignment surface perpendicular to said workpiece seating surface for aligning a workpiece;
a bearing means being pivotable about a pivot axis relative to said seating table, said bearing means having a rotary disc and a side arm disposed above said rotary disc, said workpiece seating surface of said seating table at least partially covering said rotary disc of said bearing means for supporting the workpiece above said rotary disc;
a base plate, said bearing means pivotally supported on said base plate, said base plate being disposed below said bearing means;

a miter arm being pivotable about the pivot axis;

a sliding guide device disposed below said base plate, said miter arm and said sliding guide device being pivotable relative to said base plate and said seating table;

a sawing device disposed on said miter arm, said sawing device being displaceable by means of said sliding guide device; and said bearing means, said base plate and said sliding guide device being formed as separate subassemblies disposed sequentially one above another.

2. The circular and miter saw according to claim 1,
wherein said base plate has an arcuate guide slot formed therein, said arcuate guide slot being disposed concentrically in relation to the pivot axis; and further comprising at least one guide element, said sliding guide device and said bearing means being connected to one another by said at least one guide element extending through said guide slot.

3. The circular and miter saw according to claim 1, wherein:

said bearing means has an at least partially cylindrical bearing projection in a region of said pivot axis; and said seating table has an at least partially cylindrical opening formed therein in the region of the pivot axis, said at least partially cylindrical bearing projection engaging in said at least partially cylindrical opening in a form fitting manner.

4. The circular and miter saw according to claim 3, wherein said side arm has a groove formed therein and extends parallelwise in relation to a miter axis, said sawing device configured such that said sawing device can be inserted, with a saw blade, into said groove.

5. The circular and miter saw according to claim 4, wherein said seating table has a generally V-shaped recess formed therein, said side arm being pivotable within said V-shaped recess.

6. The circular and miter saw according to claim 5, wherein said V-shaped recess opens into said at least partially cylindrical opening.

7. The circular and miter saw according to claim 1, wherein said seating table has two projections, which taper towards said pivot axis at an acute angle and which are delimited by said two upwardly projecting stop strips, said projections have top sides serving as said workpiece seating surface.

8. The circular and miter saw according to claim 7, wherein said workpiece seating surface extends substantially up to said pivot axis.

9. The circular and miter saw according to claim 4, wherein said groove extends along said side arm as far as into said at least partially cylindrical bearing projection.

10. The circular and miter saw according to claim 1, further comprising a locking mechanism, a pivot position of said bearing means relative to said seating table can be detachably fixed by means of said locking mechanism.

11. The circular and miter saw according to claim 4, wherein said sliding guide device has at least one sliding guide and at least one guide rod, said sliding guide being disposed on said bearing means, and said guide rod being displaceable through said sliding guide, parallelwise in relation to a miter axis.

12. The circular and miter saw according to claim 1, further comprising:

a rod clamping piece;

two guide rods connected to one another at a first end by said rod clamping piece; and a miter-arm mount disposed at a second end of said guide rods.

13. The circular and miter saw according to claim 1, further comprising a miter-arm mount, said miter arm being rotatably mounted on said miter-arm mount so as to be pivotable about a miter axis.

14. The circular and miter saw according to claim 12, further comprising:

a miter plate disposed on a first side of said miter arm; and a counter-plate disposed on a second side of said miter arm, said miter-arm mount being disposed between said miter plate and said counter-plate.

15. The circular and miter saw according to claim 14, wherein said miter plate has a flexible joint piece with a bolt opening formed therein, and said miter-arm mount has an arcuate, elongate hole formed therein; and further comprising a miter setting bolt engaging through said arcuate, elongate hole and said bolt opening.

16. The circular and miter saw according to claim 1, wherein said miter arm is substantially L shaped.

17. The circular and miter saw according to claim 1, wherein said sawing device is pivotally mounted on said miter arm.

18. The circular and miter saw according to claim 1, wherein said seating table has a slot formed therein for said upwardly projecting stop strips, said upwardly projecting stop strips engaging in said slot.

19. The circular and miter saw according to claim 1, further comprising a base frame having a plurality of feet disposed so as to be pivotally adjustable on at least one of said seating table or on said base plate, such that irregularities of the ground can be compensated.

20. The circular and miter saw according to claim 19, further comprising setting screws, a relative position of said feet in relation to at least one of said seating table or said base plate can be set by means of a respective one of said setting screws.

21. The circular and miter saw according to claim 1, wherein said sawing device is disposed on said miter arm above said seating table.

22. The circular and miter saw according to claim 2, wherein said at least one guide element is selected from the group consisting of bolts and screws.

23. The circular and miter saw according to claim 11, wherein said sliding guide is disposed on said rotary disk of said bearing means.

* * * * *